Oct. 15, 1940.          F. V. LONG          2,217,958
GAUGE READING BOX FOR CLOSED TANKS
Filed April 4, 1938

Inventor
Frank V. Long
By Lyon & Lyon
Attorneys

Patented Oct. 15, 1940

2,217,958

UNITED STATES PATENT OFFICE 2,217,958

GAUGE READING BOX FOR CLOSED TANKS

Frank V. Long, Compton, Calif.

Application April 4, 1938, Serial No. 199,932

3 Claims. (Cl. 73—321)

This invention relates to a reading box for facilitating the gauging of the liquid level of a closed tank.

Heretofore it has been the common practice to provide means for gauging the depth of oil tanks, gasoline tanks or the like, operated from within, through the roof of the tank; but recently types of tanks have come into use in which the tank is usually under internal pressure, and these types of tanks usually have a rounded or dome-shaped roof, which makes it very difficult for a gauge reader to go up on the roof to make gauge readings. Some types are of a vertical cylinder type of considerable height. Also these tanks change their shape under variations in pressure and temperature, and if the gauge tape is carried out through the roof, the readings will be inaccurate if the upper head of the tank rises or falls from time to time.

One of the objects of this invention is to provide gauging apparatus of simple construction, which will enable a tank of this kind to be gauged readily without necessitating a person's ascending to the roof, and to enable the reading to be accomplished by a gauge apparatus placed at the side of the tank and below the level of the liquid in the tank.

The apparatus involves the use of a closed casing or housing connecting at any level through the top or side of the tank, the interior of which is in communication with the interior of the tank through a duct, and through this duct the indicating means is connected to a float in the tank. The housing for the indicating mechanism, or graduated scale, in the closed housing, is usually provided with a glass plate through which the reading is taken. If this plate becomes broken, a valve in the duct connecting to the tank must be closed and the gauge is out of commission until the glass plate can be replaced, if said duct passes into the tank below the liquid level, or if said duct passes into the tank above the liquid level, in case the liquid is a volatile liquid with gas above it, the tank will be depressured which would defeat the purpose for which the pressure is maintained.

One of the objects of this invention is to provide a construction whereby in case of an accident to the plate, the broken plate can be readily removed and a new glass plate replaced without putting the gauge out of commission, or of depressuring the tank.

Heretofore, in order to provide for reading the gauge or graduated scale at the reading point, the closed housing enveloping the same has been provided with laterally extending necks, the outer ends of which carry the glass plates through which the reading of the scale can be accomplished, and to the outer faces of which are installed stop valves. One of the difficulties arising is that the stop valves, being on the outer side of the glass plate, do not permit replacement of the glass plate without losing liquid or depressuring the tank.

One of the objects of this invention is to overcome this difficulty and to provide a housing of this kind with simple means for facilitating the glass plate replacement without losing liquid or depressuring the tank and facilitating the illumination and reading of the scale at the reading point.

Further objects of the invention will appear hereinafter.

The invention consists in the novel parts and combination of parts to be described hereinafter, all of which contribute to produce an efficient gauge reading box for closed tanks.

A preferred embodiment of the invention is described in the following specification, while the broad scope of the invention is pointed out in the appended claims.

Figure 1:
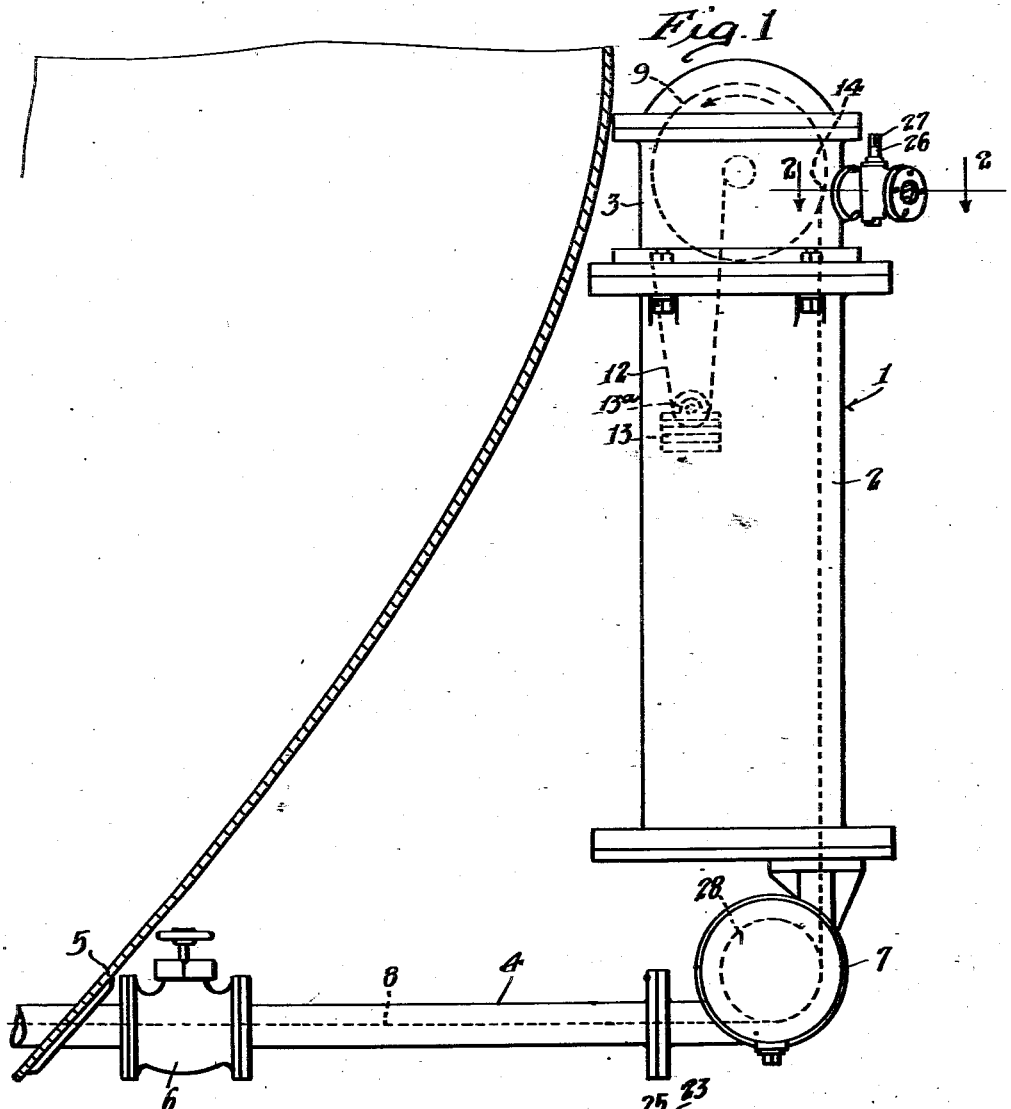
Fig. 1 is a vertical section taken through the side of a tank, and showing my apparatus in side elevation. This view shows only a portion of the tank wall, which is supposed to be at a point below the liquid level.

In practicing the invention, I provide a housing 1, which preferably includes an upright tubular body 2, and a cap or head 3 that closes the upper end of the body 2. The lower end of the housing 1 is in communication with the interior of the tank through a scale passage or duct 4 that passes through the side wall 5 of the tank. This duct 4 is preferably made out of piping, and may include a valve 6 and an enlarged elbow 7 connected to the bottom of the housing body 2. Through this duct 4 communication is had with a float or other means within the tank, to operate indicating mechanism at the reading head 3. In the present instance, I prefer to employ a flat steel tape 8, which carries a graduated scale, said scale being wrapped upon a vertically disposed sheave 9. Suitable means is provided for taking up the slack. For this purpose I may provide a coil 10 of cord or wire wrapping around a hub 11 on the sheave (see Figure 2) and this cord hangs down in a loop 12 carrying a weight 13 on a pulley or sheave 13a. This weight, of course, urges the sheave 9 to rotate in a counter-clockwise direction as indicated by the arrow in Fig. 1.

The point 14 is the reading point, that is to say, the point at which the graduations on the scale may be read from the exterior. In order to make this possible, I prefer to provide the housing head 3 with two ducts 15 and 16, which are formed respectively in necks projecting from the side of the casing. In order to accomplish this, I prefer to form a casing wall with two seats 17 and 18, and on these seats I attach shut off fittings 19 and 20, the outer ends of which are closed by glass plates 21 and 22 respectively. By reference to Fig. 2, it will be seen that the scale 8 at the reading point is located in a substantially vertical plane, and substantially at the intersection of the axes of the two ducts 15 and 16. With this arrangement it will be evident that if a light is held outside of the plate 21, the light beam may be thrown upon the scale and the scale can be viewed through the plate 22, or vice versa.

Figure 2:
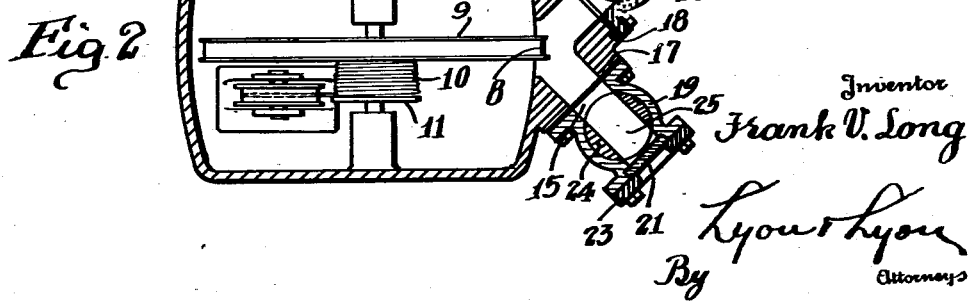
Fig. 2 is a horizontal section taken about on the line 2—2 of Fig. 1 upon an enlarged scale, and further illustrating the preferred construction of the housing with its means for enabling the scale within the housing to be readily visible from the exterior.

Although I prefer to employ two necks as shown in Fig. 2, for effecting the reading of the scale, a single neck could be provided. In either case, I provide means for closing the duct between the glass plate and the reading point of the scale. Hence if the glass plate becomes broken, the duct can be closed and a new glass plate put in position. The glass plates 21, 22, are held in place at the outer sides of the fittings by suitable followers 23 that are bolted in position. Means for closing the ducts between the plates 21, 22, and the reading point, preferably consists of rotary plugs 24. In Fig. 2, these plugs are shown in their open position. Each plug is formed with a bore 25 which, in the open position of the plug, aligns with the remainder of the duct of which it forms a part. These ducts are preferably of circular cross-section. The plugs 24 have stems 26 respectively, extending upwardly from them and formed with angular shanks 27 respectively, for the application of a wrench to rotate the plug. It should be understood that the valve 6 would always be left open, and this valve is employed simply for emergency, to be closed in case of some accident to the housing 1, head 3, elbow 7 or the duct 4.

Within the elbow 7 I provide a sheave 28 about which the tape or scale 8 passes before running up into the housing 1.

The housing 1 and the duct 4 should, of course, be constructed to withstand the hydrostatic pressure existing at the bottom of the tank, and any surface pressure which may exist on the level of the liquid; for example, two and one-half to twenty pounds, which is the common pressure in such cases. On some types of tanks this pressure may be several hundred pounds.

It will be evident that with this apparatus, the liquid level in the tank can be readily gauged at the side of the tank and near the ground level.

Normally the plugs 24 would be left in their closed positions, and are only opened when a reading of the scale is to be taken. In case of the accidental breaking of either the plates 21 or 22, it will be evident that the plug corresponding to it could be immediately closed, and the glass plate replaced by a sound one without losing liquid or depressuring the tank.

It is understood that the embodiment of the invention described herein is only one of the many embodiments this invention may take, and I do not wish to be limited in the practice of the invention, nor in the claims, to the particular embodiment set forth.

What I claim is:

1. In a reading box for facilitating the gauging of the liquid level of a closed tank under pressure, the combination of a housing, indicating means carried therein for indicating the liquid level in the tank, said housing located below the liquid level of the tank and at the side of the tank, said indicating means including a graduated scale, a closed guide duct for the scale communicating with the interior of the tank and with the interior of said housing, said housing having a light-admitting duct with a transparent plate covering the same for admitting outside light to the point at which the reading is taken, and having a second duct disposed at an angle to the first-named duct with a transparent plate closing the outer end of the same through which the indicating means may be viewed, and means in each of said ducts between its transparent plate and the reading point, for closing the duct.

2. In a reading box for facilitating the gauging of the liquid level of a closed tank, the combination of indicating means for indicating the liquid level in the tank, a closed housing enveloping the indicating means, a closed duct communicating with the interior of the housing and with the interior of the tank, said indicating means including a graduated scale extending through said duct and through the interior of the housing up to the reading point at which the graduations on the scale are to be read, said housing having a light-admitting duct with a transparent plate closing the same for admitting outside light to the scale at the reading point, and having a second duct disposed at an angle to the first-named duct and having a transparent plate closing the same and through which the scale may be viewed, and a rotary plug mounted in each duct between its transparent plate and the scale, each rotary plug having a passage therethrough to align with the duct when the plug is in its open position, said plugs being capable of rotation to close said ducts.

3. In a reading box for facilitating gauging of the liquid level of a closed tank that may contain a volatile liquid, the combination of a closed gas-tight housing, the interior of which is in communication with the interior of the tank, said housing having a light-admitting duct with a transparent plate closing the same for admitting outside light to the point at which the reading is taken, said housing having a second duct disposed at an angle to the first-named duct and having a transparent plate closing the outer end of the same and through which the indicating means may be viewed, an indicating scale mounted for movement through the said housing in a direction substantially at right angles to the plane in which the axes of said ducts lie, means for taking up the slack of the scale during a rise and fall of the level of the liquid in the tank, and means in each of said ducts between its transparent plate and the reading point for closing off the duct as an outlet from the tank.

FRANK V. LONG.